United States Patent
Danielson

(10) Patent No.: US 10,488,068 B2
(45) Date of Patent: Nov. 26, 2019

(54) SYSTEM AND METHOD FOR GENERATING A CONTROLLER FOR MULTI-ZONE HEATING, VENTILATION, AND AIR CONDITIONING SYSTEM

(71) Applicant: Mitsubishi Electric Research Laboratories, Inc., Cambridge, MA (US)

(72) Inventor: Claus Danielson, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 66 days.

(21) Appl. No.: 15/658,876

(22) Filed: Jul. 25, 2017

(65) Prior Publication Data

US 2019/0032940 A1 Jan. 31, 2019

(51) Int. Cl.
*F24F 11/62* (2018.01)
*F24F 11/30* (2018.01)
(Continued)

(52) U.S. Cl.
CPC .............. *F24F 11/62* (2018.01); *F24F 11/30* (2018.01); *G05B 19/048* (2013.01); *G05D 23/1919* (2013.01); *G05D 23/1932* (2013.01); *G06F 17/5009* (2013.01); *F24F 11/56* (2018.01); *F24F 11/65* (2018.01); *F24F 2110/10* (2018.01); *G05B 2219/2614* (2013.01); *G06F 17/5004* (2013.01); *G06F 2217/16* (2013.01)

(58) Field of Classification Search
None
See application file for complete search history.

(56) References Cited

PUBLICATIONS

Mohammad Attaran et al., "Decoupled HVAC System via Non-Linear Decoupling Algorithm to Control the Parameters of Humidity and Temperature through the Adaptive Controller," International Journal of Scientific and Research Publications, vol. 4, No. 4, Apr. 1, 2014. pp. 1-14.

(Continued)

*Primary Examiner* — Carlos R Ortiz Rodriguez
(74) *Attorney, Agent, or Firm* — Gennadiy Vinokur; James McAleenan; Hironori Tsukamoto

(57) ABSTRACT

A computer-implemented system for generating a controller to control a heating, ventilation, and air conditioning (HVAC) system decomposes a model of the HVAC system into a collection of transformed models defining relationship between input channels and output channels with decoupled dynamics, such that a single input channel affects only one corresponding output channel Each input channel is defined by a weighted combination of control inputs to the HVAC system, and each output channel is defined by a weighted combination of temperatures affected by operation of the HVAC system. The collection of decoupled transformed models includes a first transformed model modeling dynamics of the outdoor unit as a relationship between uniform control for the set of indoor units and the average temperature in the set of rooms and includes a set of second transformed models. Each second transformed model models a difference between room dynamics and room coupling dynamics. The system generates a decouple controller for each transformed model to form a collection of decoupled controllers, wherein, each decouple controller defines a relationship between measurements the output channel and inputs to the input channel of the corresponding transformed model.

20 Claims, 11 Drawing Sheets

(51) Int. Cl.
*G05B 19/048* (2006.01)
*G05D 23/19* (2006.01)
*G06F 17/50* (2006.01)
*F24F 11/65* (2018.01)
*F24F 11/56* (2018.01)
*F24F 110/10* (2018.01)

(56) References Cited

PUBLICATIONS

Yuling Shen et al., "Multivariable Process Control: Decentralized, Decoupling or Sparse?," Industrial and Engineering Chemistry Research. vol. 49, No. 2, Jan. 20, 2010. pp. 761-771.

SYSTEM AND METHOD FOR GENERATING A CONTROLLER FOR MULTI-ZONE HEATING, VENTILATION, AND AIR CONDITIONING SYSTEM

TECHNICAL FIELD

This invention relates to heating, ventilation, and air conditioning (HVAC) systems, and more particularly to a system and method for generating a controller for HVAC systems with multiple indoor units.

BACKGROUND

Heating, ventilation, and air conditioning (HVAC) systems move thermal energy between a low temperature environment and a high temperature environment in order to perform cooling or heating operations so that the comfort of the occupants in an indoor space can be maintained or improved. For example, heat can be moved from an indoor space to an outdoor space in order to lower the indoor temperature or mitigate the effect of thermal energy infiltrating an indoor space in a cooling operation. Conversely, heat can be moved from an outdoor space to an indoor space in order to raise the indoor temperature or mitigate the effect of thermal energy exfiltration an indoor space in a heating operation.

A multi-indoor unit HVAC system includes at least a single compressor and single outdoor heat exchanger connected to multiple indoor heat exchangers arranged in one or more indoor units. Refrigerant flow is split among the indoor units and modulated with flow metering valves arranged between the indoor heat exchangers and outdoor heat exchanger. These flow metering valves can also serve as the main pressure reducing device required to lower the refrigerant temperature and pressure in order to complete the vapor compression cycle. Depending on the state of a four-way valve connected to the compressor, high pressure refrigerant can flow from the compressor to the outdoor unit (in which case the outdoor unit heat exchanger is a condenser and the indoor unit heat exchangers are evaporators) or refrigerant can flow from the compressor to the indoor units and the roles of the indoor and outdoor heat exchangers are reversed.

Recent advancements in power electronics and low cost micro-controllers have led to variable speed compressors, electronically controlled valves, and variable speed fans. The control of these actuators must be coordinated to achieve room temperature regulation and enforce machine limitations such as a maximum safe pressure of the refrigerant or a maximum safe temperature of a system component.

One challenge for controller HVAC systems is that the system dynamics are modeled by very high-dimensional models, especially when the number of indoor units is large, for instance when regulating the temperatures in an office building. This makes controller generation very time and resource consuming since the numerical complexity of generating controllers grows non-linearly with model dimension. For instance, a popular method for generating controllers is using linear matrix inequalities (LMI). However, generating a controller using LMI based techniques for a moderately sized building with 50 indoor units requires up to 41 hours of computation. This issue is compounded by the fact that controller generation is typically an iterative process in which an engineer generates a controller, tests the controller, and then tweaks some of the design parameters to generates an improved controller.

There is a need for a system and method for generating controllers for large-scale HVAC systems that has low computational complexity while preserving the desired properties of the resulting controller.

SUMMARY

Some embodiments are based on recognition that a heating, multi-unit ventilation, and air conditioning (HVAC) system that includes at least one outdoor unit and multiple indoor units is a dynamically coupled system. In such a dynamically coupled system, a single control input to the outdoor and indoor units affects the performance of others units. Similarly, the single control input affects different outputs of the HVAC system. Examples of the outputs of the HVAC system include temperature measurements in various rooms conditioned by the HVAC system. Accordingly, one output of the HVAC system can or should influence different control inputs to the HVAC system. A controller of multi-unit HVAC system relates outputs of the HVAC system to the control inputs to the multi-unit HVAC system. Therefore, designing such a controller relating inputs and outputs of the multi-unit HVAC system is computationally intensive.

Some embodiments are based on realization that the inputs and outputs of the HVAC system can be abstracted to gain a design flexibility that can be used to decouple the controller. Specifically, the inputs and outputs of the HVAC system can be abstracted using input and output channels. An input channel an abstraction represented by a weighted combination of control inputs to the conditioning units of HVAC. Similarly, an output channel is a weighted sum of measured outputs of the HVAC system. For instance, for an HVAC system with one outdoor and three indoor units, an input channel can send no command to the outdoor unit, the same command to the first and second indoor units, and 50% of that command to third indoor unit. The output channel is a weighted sum of temperatures in the rooms conditioned by the first, second and third indoor units.

The input channels can be combined (lifted) using vectors of weights to form control inputs to the HVAC system. To that end, knowing the input channels, the control inputs to the HVAC system can be readily determined. The output channels can be obtained by applying the vectors of weights to the outputs of the HVAC system. To that end, knowing the outputs, the output channels of the HVAC system can be readily determined.

Some embodiments are based on realization that a model of the HVAC model can be decomposed or transformed by finding input and output channels that have decoupled dynamics, such that an input channel affects only one corresponding output channel Such a decomposition allows determining controllers for decomposed models connecting corresponding input and output channels. In such a manner each controller can be determined independently from another controller, which simplifies the controller generation.

For example, some embodiments decompose the model of the HVAC system into a collection of decoupled transformed models defining relationship between input channels and output channels with decoupled dynamics, such that a single input channel effects only one corresponding output channel Each input channel is defined by a weighted combination of control inputs to the HVAC system, and each output channel is defined by a weighted combination of temperatures affected by operation of the HVAC system.

Some embodiments are based on the realization that in order to achieve the decoupled dynamics, one pair of input and output channels relates the outdoor unit inputs and uniform control to all the indoor units with the average temperature of all the rooms and other pair of input and output channels can be defined by weight vectors orthogonal to each other.

Some embodiments are based on the realization that, although HVAC systems are complex, they are built from a large number of simple components that are repeated multiple times. For instance, an HVAC system typically has a single outdoor unit connected to multiple indoor units of the same design or one of a few available designs. It is realized that these symmetries in the HVAC system can be exploited to simplify computations required to generate a controller for an HVAC system.

To that end, some embodiments decompose the model of the HVAC system into a collection of decoupled transformed models including a first transformed model modeling dynamics of the outdoor unit as a relationship between uniform control for the set of indoor units and the average temperature in the set of rooms, and a set of second transformed models, each second transformed model models a difference between room dynamics and room coupling dynamics. All second transformed models are identical while modeling relationship between different input and the output channels. In such a manner, the embodiment can generate a decouple controller for each transformed model to form a collection of decoupled controllers, where each decouple controller defines a relationship between measurements the output channel and inputs to the input channel of the corresponding transformed model.

In such a manner, the computational complexity of designing the controller for the multi-unit HVAC system is reduced thereby improving the computer itself.

Accordingly, one embodiment discloses a computer-implemented system for generating a controller to control a heating, ventilation, and air conditioning (HVAC) system in a building including at least one outdoor unit located outside of the building and a set of indoor units located in a set of rooms inside of the building. The system includes an input interface to accept a model of dynamics of the HVAC system defining relationship of inputs to the HVAC system to outputs of the HVAC system; a processor to decompose the model of the HVAC system into a collection of transformed models defining relationship between input channels and output channels with decoupled dynamics, such that a single input channel affects only one corresponding output channel, wherein each input channel is defined by a weighted combination of control inputs to the HVAC system, and wherein each output channel is defined by a weighted combination of temperatures affected by operation of the HVAC system, wherein the collection of decoupled transformed models includes a first transformed model modeling dynamics of the outdoor unit as a relationship between uniform control for the set of indoor units and the average temperature in the set of rooms; and a set of second transformed models, each second transformed model models a difference between room dynamics and room coupling dynamics, wherein all second transformed models are identical while modeling relationship between different input and the output channels; and generate a decouple controller for each transformed model to form a collection of decoupled controllers, wherein, each decouple controller defines a relationship between measurements the output channel and inputs to the input channel of the corresponding transformed model; and an output interface to output the collection of decoupled controllers as the controller to control the HVAC system.

Another embodiment discloses a method for generating a controller to control a heating, ventilation, and air conditioning (HVAC) system in a building including at least one outdoor unit located outside of the building and a set of indoor units located in a set of rooms inside of the building, wherein the method uses a processor coupled with stored instructions implementing the method, wherein the instructions, when executed by the processor carry out at least some steps of the method. The method includes decomposing a model of dynamics of the HVAC system defining relationship of inputs to the HVAC system to outputs of the HVAC system into a collection of decoupled transformed models defining relationship between input channels and output channels with decoupled dynamics, such that a single input channel effects only one corresponding output channel, wherein each input channel is defined by a weighted combination of control inputs to the HVAC system, and wherein each output channel is defined by a weighted combination of temperatures effected by operation of the HVAC system, wherein the collection of decoupled transformed models a first transformed model modeling dynamics of the outdoor unit as a relationship between uniform control for the set of indoor units and the average temperature in the set of rooms; and a set of second transformed models, each second transformed model models a difference between room dynamics and room coupling dynamics, wherein all second transformed models are identical while modeling relationship between different input and the output channels; generating a decouple controller for each transformed model to form a collection of decoupled controllers, wherein, each decouple controller defines a relationship between measurements the output channel and inputs to the input channel of the corresponding transformed model; and outputting the collection of decoupled controllers as the controller to control the HVAC system.

Yet another embodiment discloses a non-transitory computer readable storage medium embodied thereon a program executable by a processor for performing a method. The method includes decomposing a model of dynamics of the HVAC system defining relationship of inputs to the HVAC system to outputs of the HVAC system into a collection of decoupled transformed models defining relationship between input channels and output channels with decoupled dynamics, such that a single input channel effects only one corresponding output channel, wherein each input channel is defined by a weighted combination of control inputs to the HVAC system, and wherein each output channel is defined by a weighted combination of temperatures effected by operation of the HVAC system, wherein the collection of decoupled transformed models includes a first transformed model modeling dynamics of the outdoor unit as a relationship between uniform control for the set of indoor units and the average temperature in the set of rooms; and a set of second transformed models, each second transformed model models a difference between room dynamics and room coupling dynamics, wherein all second transformed models are identical while modeling relationship between different input and the output channels; generating a decouple controller for each transformed model to form a collection of decoupled controllers, wherein, each decouple controller defines a relationship between measurements the output channel and inputs to the input channel of the corresponding transformed model; and outputting the collection of decoupled controllers as the controller to control the HVAC system.

DETAILED DESCRIPTION

Figure 1A:
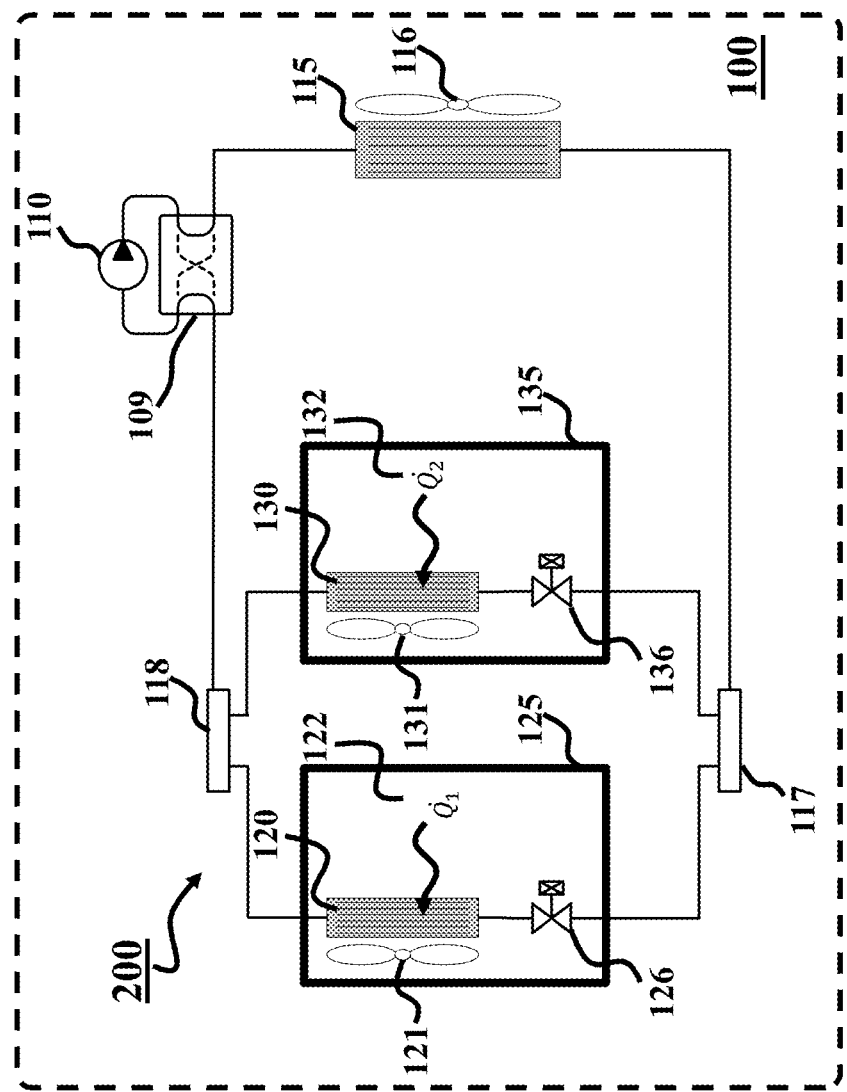
FIGS. 1A and 1B show block diagrams of a heating, ventilation, and air conditioning (HVAC) systems controlled by a controller generated according to principles employed by some embodiments.
Figure 1B:
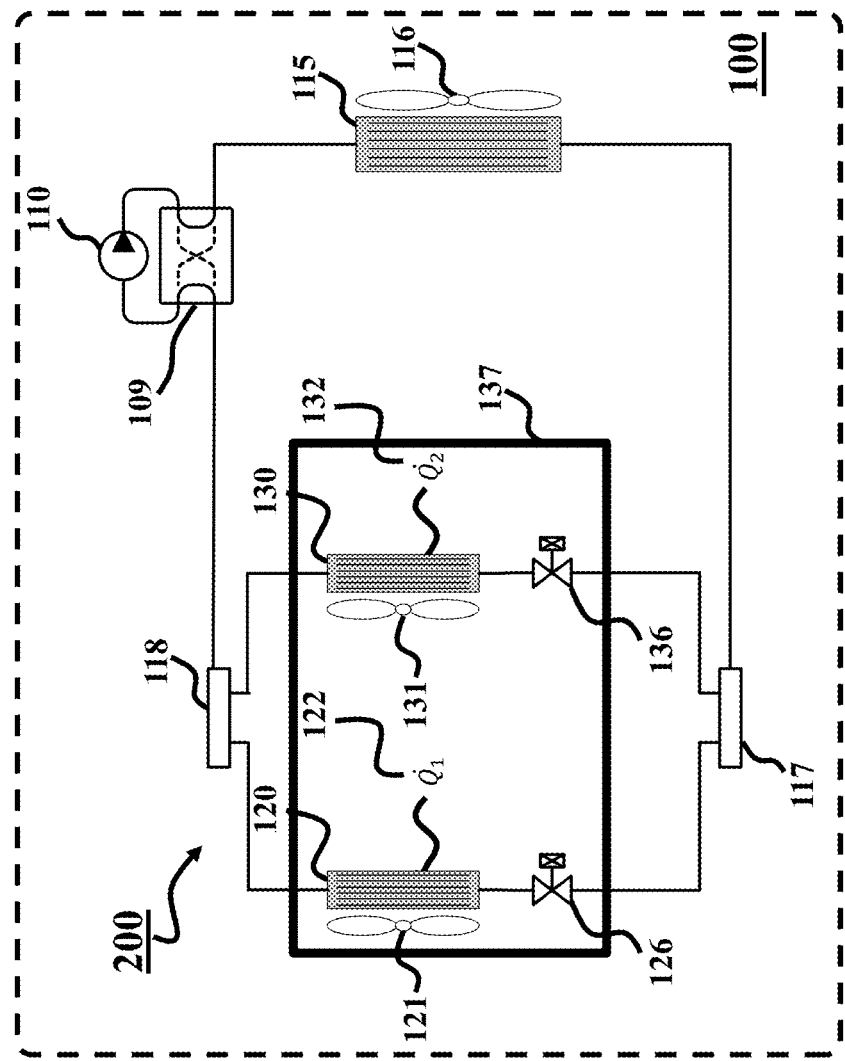

FIGS. 1A and 1B show block diagrams of a heating, ventilation, and air conditioning (HVAC) systems (100) controlled by a controller (200) generated according to principles employed by some embodiments. The HVAC system includes at least one outdoor unit located outside of the building conditioned by the HVAC system and a set of indoor units located in corresponding rooms inside of the building. For example, the HVAC system can be implemented using a compressor and a set of heat exchangers configured for controlling environments in a set of rooms. The indoor units can be installed in different rooms and/or the same room.

In this disclosure, a two indoor unit HVAC system is depicted and described for clarity, but it should be understood that any number of indoor units can be used, subject to the physical limitations of refrigerant line lengths, capacity and pumping power of the compressor, and building codes.

A compressor (110) receives a low-pressure refrigerant in a vapor state and performs mechanical work to increase the pressure and temperature of the refrigerant. Depending on the configuration of a four-way valve (109), the high temperature refrigerant can be routed to either an outdoor heat exchanger (in which case the system moves heat to the outside environment and is providing useful cooling and is said to operate in cooling mode) or to an indoor heat exchanger (in which case the system moves heat to one or more indoor units and is providing useful heating and is said to operate in heating mode).

For clarity and in order to simplify the subsequent description, a cooling mode is generally considered, i.e., the compressor is connected to the rest of the vapor compression system as shown as solid lines of the four-way valve (109), but it should be understood that analogous statements can be made about the system operating in heating mode with appropriate substitutions, e.g., condenser for evaporator, condensing temperature for evaporating temperature, etc.

In cooling mode, the high-temperature, high-pressure refrigerant moves to an outdoor heat exchanger (115) and in the case of an air-source vapor compression system, an associated optional fan (116) blows air across the heat exchanger, where the air acts as a heat source or sink as shown in 1. In the case of a ground-source vapor compression system, components of outdoor heat exchanger may be buried underground or otherwise in direct contact with earth or water, and in that case, the ground environment acts as a heat source or sink. Heat is transferred from the refrigerant to the environmental heat source or sink, causing the refrigerant in the outdoor heat exchanger to condense from a vapor to a liquid.

The phase change process wherein vapor refrigerant condenses from saturated vapor to a two-phase mixture of both liquid and vapor to saturated liquid is isothermal in ideal descriptions of the vapor compression cycle, that is, the phase change process occurs at a constant temperature and therefore without a sensible change in temperature. However, if further heat is removed from the saturated liquid, the temperature of the saturated liquid then decreases by some amount and the refrigerant is termed "subcooled". The subcool temperature is the temperature difference between the subcooled refrigerant and the calculated saturated liquid refrigerant temperature at the same pressure.

Liquid high temperature refrigerant exits the outdoor heat exchanger and is split by a manifold (117) in order to distribute the refrigerant between the subsequently connected indoor units (125) or (135). Separate expansion valves (126), (136) are connected to the inlet manifold. These expansion valves are restriction elements and cause the pressure of the refrigerant to be substantially reduced. Since the pressure is reduced without substantial heat exchange in the valve, the temperature of the refrigerant is substantially reduced, termed "adiabatic" in ideal descriptions of the vapor compression cycle. The resulting refrigerant exiting the valves is a low pressure, low temperature two-phase mixture of liquid and vapor.

Two-phase refrigerant enters the indoor heat exchangers (120), (130) where associated fans (121), (131) move air across the heat exchangers. Heat (122), (132) representing the thermal loads from the indoor spaces is transferred from the rooms to the refrigerant, causing the refrigerant to evaporate from a two-phase mixture of liquid and vapor to a saturated vapor state.

The phase change process wherein refrigerant evaporates from a saturated vapor to a two-phase mixture of both liquid and vapor to saturated vapor is isothermal in ideal descriptions of the vapor compression cycle, i.e., occurs at a constant temperature and therefore is a process that occurs without a sensible change in temperature. However, if further heat is added to the saturated vapor, the temperature of the saturated vapor then increases by some amount and the refrigerant is termed "superheated". The superheat temperature is the difference between the superheated refrigerant vapor and the calculated saturated vapor temperature at the same pressure.

The low pressure refrigerant vapor exiting the indoor unit heat exchangers is rejoined to a common flow path at the outlet manifold (118). Finally, low pressure refrigerant vapor is returned to the compressor and the cycle repeats. The principal actuators in the HVAC (100) may include the compressor (110), the outdoor heat exchanger fan (116), the indoor heat exchanger fans (121), (131) and the expansion valves (126), (136).

Figure 2:
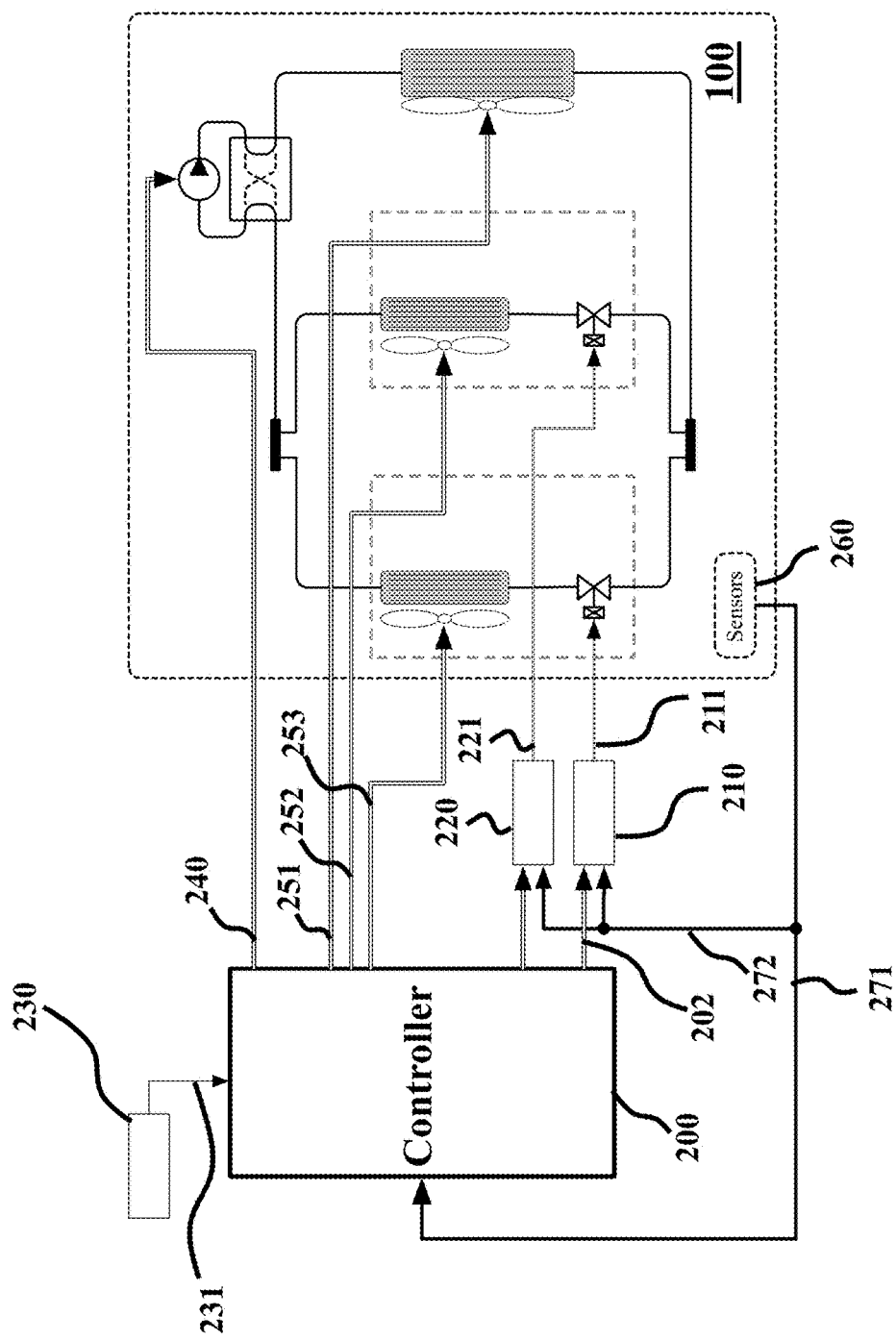
FIG. 2 shows a schematic of a HVAC system controlled by a controller generated according to some embodiments.

FIG. 2 shows a schematic of a HVAC system (100) is controlled by a controller (200) generated according to some embodiments. The controller 200 determines control inputs, i.e., commands issued to the actuators or units of the HVAC system. The control inputs may include a compressor speed command (250), an outdoor unit fan speed command (251), or indoor unit fan speed commands (252), (253). The indoor unit fan speed commands may alternatively be determined by the occupants as described below. The controller (200) receives measurements of the operation of the HVAC system. For example, the controller can receive sensor information (271) from sensors (270) arranged at various locations on the system. The spatial arrangement of sensors are not depicted in FIG. 2 for clarity and simplicity, since their precise locations within the system can vary. Additionally, the controller receives set-point information (231) from an external source such as an occupant entering desired room temperatures in a user interface module (230).

In some systems, the compressor speed command (250) can be fixed to one or more predetermined settings, or it can be varied continuously. Similarly, the outdoor heat exchanger fans (116) can operate at fixed speeds or it can be varied continuously. In some configurations, an indoor heat exchanger fan (121), (131) can be determined by the controller (200), or its speed can be determined by an occupant when the occupant wishes to directly control indoor airflow. In the case an indoor fan speed is determined by the controller, the fan speed is treated by the controller as a control input for manipulating the operation of the system. In the case an indoor fan speed is specified by an occupant, the fan speed is treated by the controller as a measured disturbance acting on the system. The expansion valves (126), (136) are controlled by the controller and may vary from a fully closed to a fully open position, including one or more intermediate positions. Some HVAC system implementations substitute electronically-controlled expansion valves with a series combination of a solenoid valve for on/off control, and a separate variable opening valve for precise flowrate control. The control inputs associated with these actuators are the compressor rotational frequency (CF) command (250), the outdoor fan speed (ODF) command (251), and each electronic expansion valve opening position (EEVi) command (211), (221).

Additional disturbances acting on the HVAC system include the heat load (122), (132) associated with each indoor unit and the outdoor air temperature (OAT). Heat loads are the amount of thermal energy moved from the indoor units to the outdoor unit per unit time. The total heat is then rejected to the atmosphere at the outdoor heat exchanger temperature, which is determined by both the OAT (a disturbance signal) and the state of the machine actuators.

The available sensors (270) can include temperature sensors that measure the evaporating temperature Te, the condensing temperature Tc, the compressor discharge temperature Td, and the air temperature Tri in each room, labeled (271) in FIG. 2, or that measure other temperatures, pressures, or flow rates. Additionally, each indoor unit may include heat exchanger coil temperature sensors (HX coil) that measure the refrigerant temperature at various locations along the heat exchanger, labeled (272) in FIG. 2.

In some implementations, the HVAC system includes capacity controllers for at least some indoor units. The capacity controllers (210) receive commands (202) from the controller (200) that indicate a desired reference cooling capacity, which is the proportional to the desired amount of heat removed from the room by each evaporator per unit time. The capacity controller (210) determines a command (211) for the EEV position to produce the desired cooling capacity, based on measurements of the coil temperatures (HX coil) (272). These capacity controllers account for the fact that the effect of EEV positions on room temperatures is nonlinear. The cooling capacity controllers linearize the responses from the reference cooling capacity (202) of each room CCCi to the associated room temperature Tri.

HVAC Modeling and Control Design

Figure 3:
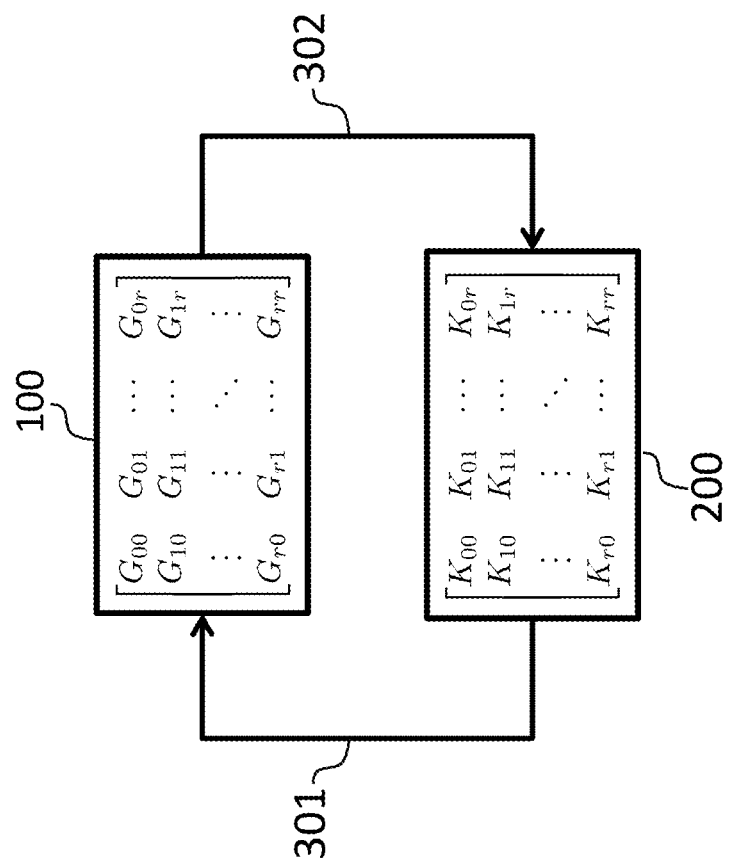
FIG. 3 shows a schematic of interactions between a controller and a HVAC system according to some embodiments.

FIG. 3 shows a schematic of interactions between a controller, such as a controller 200, and a HVAC system, such as the HVAC system 100 according to some embodiments. For example, the HVAC system (100) can be modeled by a linear model of the form $$G = \begin{bmatrix} G_{00} & G_{01} & \ldots & G_{0r} \\ G_{10} & G_{11} & \ldots & G_{1r} \\ \vdots & \vdots & \ddots & \vdots \\ G_{r0} & G_{r1} & \ldots & G_{rr} \end{bmatrix} = \begin{bmatrix} A & B_0 & B_1 & \ldots & B_r \\ C_0 & D_{00} & D_{01} & \ldots & D_{0r} \\ C_1 & D_{10} & D_{11} & \ldots & D_{1r} \\ \vdots & \vdots & \vdots & \ddots & \vdots \\ C_r & D_{r0} & D_{r1} & \ldots & D_{rr} \end{bmatrix}. \quad (1)$$

where the state-space notation $$\begin{bmatrix} A & B \\ C & D \end{bmatrix}$$

is short-hand for the set of differential equations $$\dot{x}(t) = Ax(t) + Bu(t)$$

$$y(t) = Cx(t) + Du(t).$$

In these equations $u(t) \in R^{n_u}$ is a vector containing all the control inputs (301) to the HVAC system, $y(t) \in R^{n_y}$ is a vector containing all the measured outputs (302) from the HVAC system (100), and $x(t) \in R^{n_x}$ is the non-physical state of the model. Example of the control inputs includes commands to the outdoor and multiple indoor units. Examples of the outputs include measurements of the temperatures in different rooms of the building conditioned by the HVAC system.

The linear model (1) models how the measured outputs (302) of the HVAC system (100) respond to control inputs (301) to the HVAC system (100). In turn, the controller models the control inputs (301) based on the outputs (302). The outputs (302) are signals measured by the controller which can include at least some of, but are not limited to, temperature measured in the rooms, temperatures measured at various points in the indoor or outdoor units, pressure measurements in the indoor and outdoor units, and any other available measurements. The inputs (301) are signals that can be commanded by the controller which includes, but are not limited to, valve openings, fan speeds, and compressor frequency.

The model (1) can be partitioned into various sub-models. The sub-model $$G_{00} = \begin{bmatrix} A & B_0 \\ C_0 & D_{00} \end{bmatrix}$$

models the relationship between the inputs $u_0(t)$ to the outdoor unit, e.g. compressor speed and outdoor fan speed, and the outputs $y_0(t)$ of the outdoor unit, e.g. temperatures and pressures measured in the outdoor unit. The sub-models $$G_{ii} = \begin{bmatrix} A & B_i \\ C_i & D_{ii} \end{bmatrix}$$

for i=1, . . . , r model the relationships between the inputs $u_i(t)$ to the i-th indoor units, e.g. valve openings and indoor fan speed, and the outputs $y_i(t)$ of i-th outdoor unit, e.g. room temperature or temperature of the heat exchanger. The sub-models $$G_{ij} = \begin{bmatrix} A & B_j \\ C_i & D_{ij} \end{bmatrix}$$

for i, j=1, . . . , r model the coupling between the indoor units i.e. how the input $u_j(t)$ to the j-th indoor unit effects the outputs $y_i(t)$ of the i-th indoor unit. The sub-models $$G_{0i} = \begin{bmatrix} A & B_i \\ C_0 & D_{0i} \end{bmatrix}$$

model how the inputs $u_i(t)$ to the indoor units, e.g. valve openings, effect the outputs $y_0(t)$ of the outdoor units, e.g. temperatures or pressures in the outdoor unit. The sub-models $$G_{i0} = \begin{bmatrix} A & B_i \\ C_0 & D_{0i} \end{bmatrix}$$

model how the inputs $u_0(t)$ to the outdoor units, e.g. compressor frequency or outdoor fan speed, effect the outputs $y_i(t)$ of the indoor units e.g. room temperature. One of the biggest challenges for generating controllers for HVAC systems is that the coupling dynamics are non-trivial $G_{0i} \neq 0$, $G_{i0} \neq 0$, and $G_{ij} \neq 0$ for i, j=1, . . . , r and therefore must be considered in the control design.

In some embodiments, the HVAC model (1) be a state-space model. In some other embodiments, the HVAC model (1) is not a state-space model instead the model (1) can be represented as a matrix of transfer functions that describe the input-output relationships of the HVAC system $$G(s) = C(sI-A)^{-1}B+D.$$

Some embodiments use the model (1) to generate a linear controller K (200) for the HVAC system (100). The controller K (200) is a dynamic system that measures the outputs (302) of the HVAC system (100) and produces control inputs (301) for the HVAC system (100). The controller K (200) can be implemented in hardware to form a control system. For example, the controller K (200) can be implemented using a processor coupled with the executable instructions.

The controller K (200) can have several different purposes including, but not limited to, stabilizing the dynamics of the HVAC system, providing temperature tracking in the rooms, ensuring that the equipment is operated safely, or reducing energy consumption. Various embodiments do not limit the possible closed-loop behaviors created by the linear controller K (200). Indeed some implementations are compatible with and complimentary to existing techniques for generating linear controllers. However, the objective of some embodiments is to reduce the computational burden of generating the controller that achieves the control objectives. For example, one embodiment can generate a controller using LMI based techniques for a moderately sized building with 50 indoor units with less than a second of computation.

A general linear controller for the HVAC system (1) has the form $$K = \begin{bmatrix} K_{00} & K_{01} & \cdots & K_{0r} \\ K_{10} & K_{11} & \cdots & K_{1r} \\ \vdots & \vdots & \ddots & \vdots \\ K_{r0} & K_{r1} & \cdots & K_{rr} \end{bmatrix} \quad (2)$$

where the sub-controller $K_{00}$ produces a control input $K_{00}y_0(t)$ for the outdoor units based on the measured outputs $y_0(t)$ from the outdoor unit, the sub-controllers $K_{0i}$ for i=1, . . . , r produce control inputs $K_{0i}y_i(t)$ for the outdoor unit based on the indoor unit measurements $y_i(t)$, the sub-controllers $K_{i0}$ for i=1, . . . , r produce control inputs $K_{i0}y_0(t)$ for the indoor units based on the outdoor unit measurements $y_i(t)$, the sub-controllers $K_{ii}$ for i=1, . . . , r produce control inputs $K_{ii}y_i(t)$ for each indoor unit based on that indoor units measurements $y_i(t)$, and the sub-controllers $K_{ij}$ for i, j=1, . . . , r produce control inputs $K_{ij}y_j(t)$ for an indoor unit i based on the measurements $y_j(t)$ of a different indoor unit $y_j(t)$.

The control input $u_0(t)$ to the outdoor unit is the sum of the inputs produced by the sub-controllers $K_{00}$ and $K_{0i}$ for i=1, . . . , r $$u_0(t)=K_{00}y_0(t)+\Sigma_{i=1}^r K_{0i}y_i(t).$$

The control input $u_i(t)$ to each of the indoor units i=1, . . . , r is the sum of the inputs produces by the sub-controllers $K_{i0}$ and $K_{ij}$ for j=1, . . . , r $$u_i(t)=K_{i0}y_0(t)+\Sigma_{j=1}^r K_{ij}y_j(t).$$

The difficulty in generating a controller (2) for the HVAC system (1) is that all the sub-controllers $K_{ij}$ for i, j=0, . . . , r needed to be designed jointly due to the strong coupling $G_{0i}$, $G_{i0}$, $G_{ij}$ in the HVAC system (1). The complexity of generating a controller (2) grows nonlinearly with the number of rooms r. Thus, it may not be possible or at least practical to generate of a controller for an HVAC system in a large building.

Some embodiments are based on the realization that HVAC system are assembled from a limited catalog of subsystem. Specifically, an HVAC system is usually include a single outdoor unit connected to multiple indoor units which are typically of the same design or one of a few possible designs. This symmetry of the indoor units is exploited by this invention to reduce the computational complexity of designing a controller for an HVAC system.

Because the indoor units have the same design, those indoor units have the same dynamics. In terms of the HVAC model (1), this means that the models $G_{ii}$ for i=1, ..., r that model the internal dynamics of the indoor units are the same for each indoor unit $G_{ii}=G_{jj}$ for i, j=1, ..., r. Furthermore, the models $G_{i0}$ and $G_{0i}$ that model the coupling between the outdoor unit dynamics and the indoor unit dynamics are the same for each of the indoor units $G_{0i}=G_{0j}$ and $G_{i0}=G_{j0}$ for all i, j=1, ..., r. Finally, the models $G_{ij}$ that model the coupling between the indoor units are the same for each pair of indoor units $G_{ij}=G_{lk}$ for i, j, l, k=1, ..., r.

Thus, the model of the HVAC system (1) can be simplified using the symmetry of the HVAC system according to $$G = \begin{bmatrix} G_{00} & G_{01} & \dots & G_{01} \\ G_{10} & G_{11} & \dots & G_{12} \\ \vdots & \vdots & \ddots & \vdots \\ G_{10} & G_{12} & \dots & G_{11} \end{bmatrix} \quad (3)$$

where $G_{11}=G_{ii}$ for i=1, ..., r is the model that models the internal dynamics of all the indoor units, $G_{12}=G_{ij}$ for i, j=1, ..., r is the model the models all coupling between indoor units, and $G_{10}=G_{i0}$ and $G_{01}=G_{0i}$ are the models that model the interactions between the outdoor unit and indoor units.

Some embodiments are based on recognition that the symmetric HVAC model (3) can be specified by five sub-models ($G_{00}$, $G_{11}$, $G_{10}$, $G_{01}$, and $G_{12}$) thus only five sub-controllers ($\hat{K}_{00}$, $\hat{K}_{11}$, $\hat{K}_{10}$, $\hat{K}_{01}$, and $\hat{K}_{22}$) need to be designed in order to achieve the desired control objectives. However, it is not obvious how to design these sub-controllers since the sub-models and the sub-controllers interact in complicated and coupled manner. To that end, some embodiments provide a system and a method to generate these sub-controllers in a dynamically decoupled manner to achieve the desired closed-loop behavior of the HVAC system.

Control Generation

Figure 4:
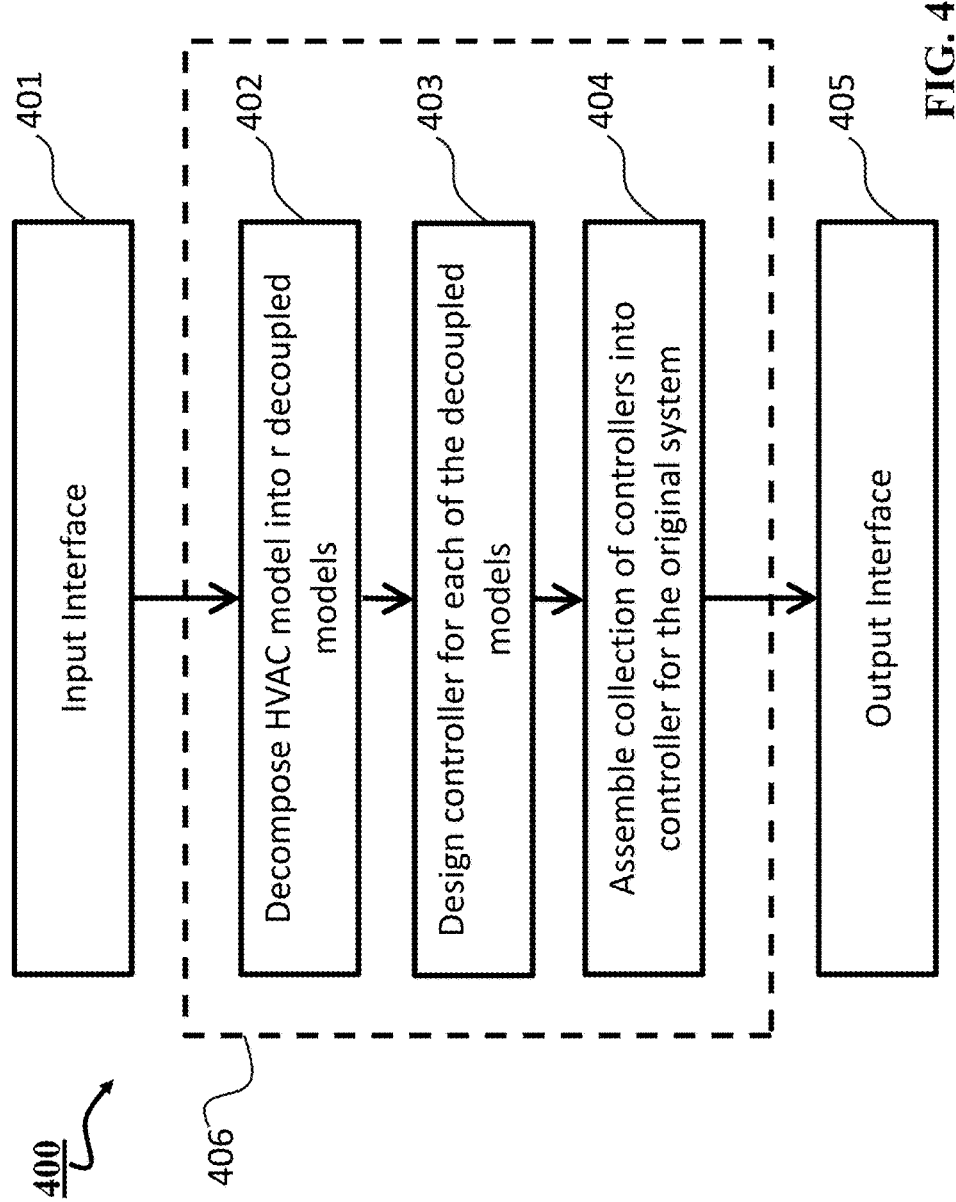
FIG. 4 shows a block diagram of a computer-implemented system for generating a controller to control the HVAC system conditioning a building according to some embodiments.

FIG. 4 shows a block diagram of a computer-implemented system (400) for generating a controller to control the HVAC system conditioning a building according to some embodiments. The HVAC system includes at least one outdoor unit located outside of the building and a set of indoor units located in a set of rooms inside of the building. An example of the controllers generated by the system 400 is a controller of Equations (2) for a symmetric HVAC system of Equations (3). The system 400 can be used to generate any type of linear controller e.g. a proportional-integral-derivative controller (PID) or a linear quadratic regulator (LQR).

The system 400 includes an input interface 401 to accept a model of dynamics of the HVAC system defining relationship of inputs to the HVAC system to outputs of the HVAC system. The input interface (401) can also be used to receive additional data specific to the desired type of controller e.g. a cost function can be received if a LQR controller is desired or a frequency weighting function can be received if a PID controller is desired. The input interface (401) can have many different manifestations including, but not limited to, a computer terminal, a web-service, an interface with modeling software, etc.

A processor (406) is used to generate a controller (2) for the HVAC system (3) according to steps 402-404. First, the processor decomposes (402) the HVAC model into a collection of decoupled transformed models, which are simpler than the original model. The collection of decoupled transformed models defines relationship between input channels and output channels with decoupled dynamics, such that a single input channel affects only one corresponding output channel Each input channel is defined by a weighted combination of control inputs to the HVAC system, and each output channel is defined by a weighted combination of temperatures affected by operation of the HVAC system.

The collection of decoupled transformed models includes a first transformed model and a set of second transformed models. The first transformed model models dynamics of the outdoor unit as a relationship between uniform control for the set of indoor units and the average temperature in the set of rooms. Each second transformed model models a difference between room dynamics and room coupling dynamics. All second transformed models are identical while modeling relationship between different input and the output channels. The decoupled transformed models are described in more details below.

Next, the processor 406 generates a collection of controllers for each of the transformed models to form a collection of decoupled controllers. Each decouple controller defines a relationship between measurements the output channel and inputs to the input channel of the corresponding transformed model. The collection of controllers can be generated using any linear control design technique e.g. pole-placement, LQR, PID, lead-lag, H-infinity, etc. Since the transformed models are dynamically decoupled, each of the controllers in the collection can be generated independently. This can be done either in parallel or in series. Furthermore, since the decomposed HVAC models are typically much smaller and simpler than the original HVAC model it requires less computation to generate the controllers. Thus, the embodiments have the ability to generate any type of linear controller using less computational resources.

The collection of controllers generated in step 403 is designed to control the collection of decomposed models from step 402. This collection can be outputted to the output interface 405. Additionally or alternatively, in one embodiment, the collection of controllers is combined 404 into a single controller that can be used to controller the original HVAC system. Advantageously, the combined controller inherits the properties of the collection of controllers. For instance, if each controller in the collection of controllers stabilizes the corresponding model in the collection of models, then the combined controller stabilizes the original HVAC system. The combination of the decoupled controllers is described in more details below.

The system 400 returns a controller using an output interface (405). The output interface (405) can have many different manifestations including, but not limited to, a computer display, a print-out, computer or assembly code for executing the controller on a computer, an analog circuit or digital computer chip that implements the controller. In one embodiment, the output interface (405) includes a transceiver for exchanging information over the Internet.

One embodiment is implemented on a portable computer carried by a technician. The technician connects the computer to the HVAC system's onboard processor. The computer downloads (401) a description of the HVAC system and generates a controller (using steps 402-404). This controller is then uploaded (405) onto the HVAC system's onboard processor. Additionally or alternatively, one embodiment is implemented as an Internet server. The HVAC system's onboard processor system can transmit (401) a description of its components through the Internet to a server, which generates a controller (using steps 402-404), and the resulting controller is downloaded (405) onto the onboard HVAC processor. The advantage of these embodiments is that that controller is generated nearly instantaneously. This allows technician installing the HVAC system to immediately move-on to the next step of the installation process instead of having delay the installation until the controller has been generated.

Input and Output Channels

Figure 5:
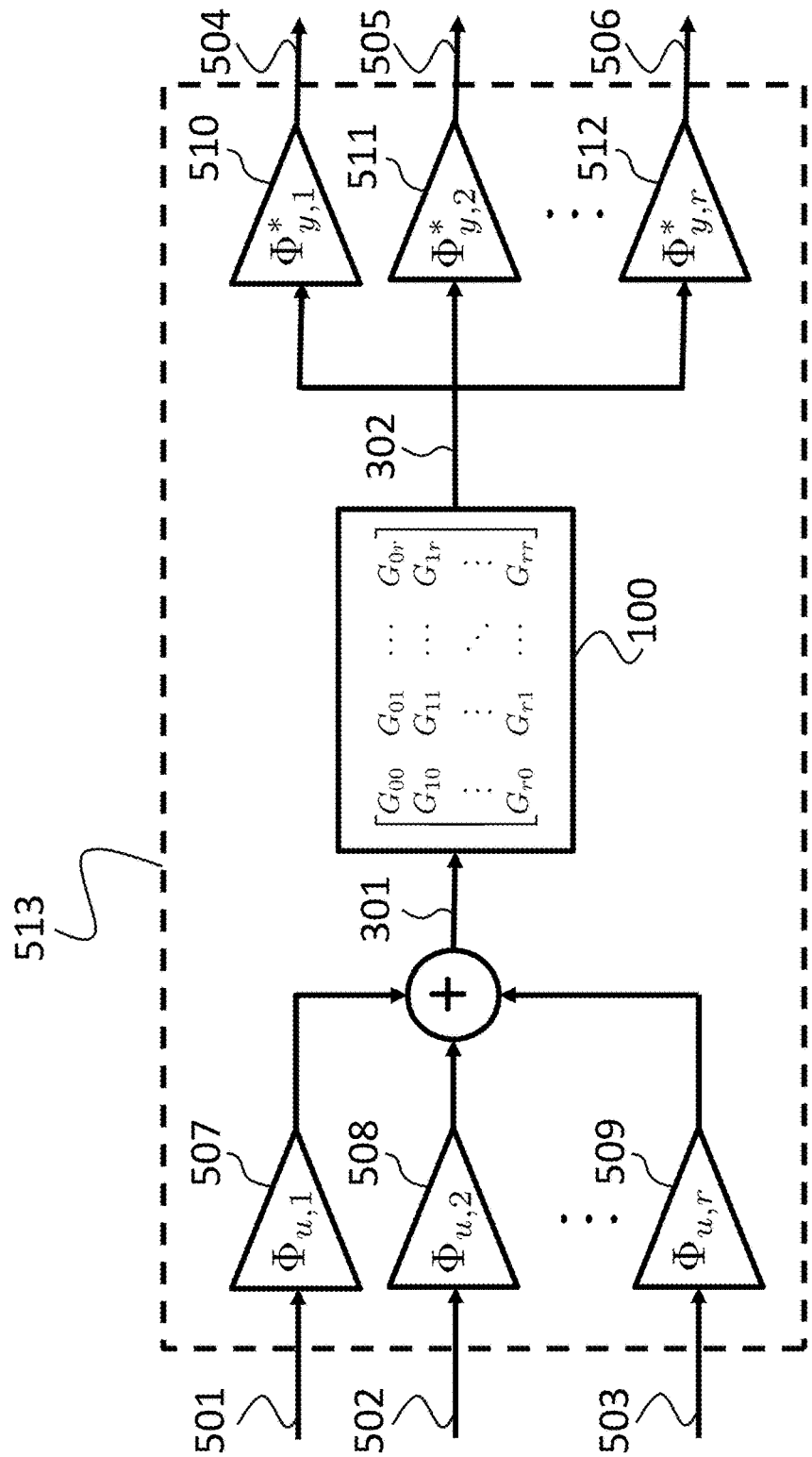
FIG. 5 shows a block diagram illustrating of how the inputs and outputs of the HVAC system can be transformed into input and output channels according to some embodiments.

FIG. 5 shows a block diagram illustrating of how the inputs and outputs of the HVAC system can be transformed into input and output channels according to some embodiments. Specifically, some embodiments decompose the HVAC model by finding input and output channels that have decoupled dynamics. An input channel $\hat{u}_j$ is a weighted combination of inputs u(t) that are concurrently actuated $$u(t) = \underbrace{\begin{bmatrix} \Phi_{u,i1} \\ \vdots \\ \Phi_{u,ir} \end{bmatrix}}_{\Phi_{u,i}} \hat{u}_i(t)$$

where $\Phi_{u,i}$ is a vector of weights that defines the i-th input channel. For instance, an input channel can send no command to the outdoor unit, the same command to the first and second indoor units, and 50% of that command to the third indoor unit would be described by the vector of weights $$\Phi_{u,1} = \begin{bmatrix} 0 \\ 1 \\ 1 \\ 0.5 \end{bmatrix}.$$

The "vector" of weights can be a matrix if the channel contains multiple signals. For instance, a channel that sends one signal to the outdoor unit and another signal uniformly to all the indoor units would be defined by the "vector" of weights $$\Phi_{u,2} = \begin{bmatrix} 1 & 0 \\ 0 & 1 \\ 0 & 1 \\ 0 & 1 \end{bmatrix}.$$

The dimensions $n_{u,i}$ of the input channels $\hat{u}_i(t) \in R^{n_{u,i}}$ are always lower than the dimension $n_u$ of the inputs $u \in R^{n_u}$ (301) to the HVAC system. Thus, $\Phi_{u,i}$ is always a "tall" matrix. Furthermore, the dimensions $n_{u,i}$ of the input channels $\hat{u}_i(t)$ must add-up to the dimension $n_u$ of the HVAC inputs u(t) i.e.

$$n_u = \Sigma_{j=1}^r n_{u,j}.$$

FIG. 5 shows an example of how the input channels (501-503) are combined using their weighting vectors (507-509) to form the input (301) of the HVAC system (100). For example, the embodiments sum corresponding control inputs produced by each decoupled controller using weights of corresponding input channels. This process is referred herein as "lifting" the input channels $\hat{u}_i(t)$ to the input u(t) to the HVAC system. The input u(t) to the system is the weighted sum of inputs from each of the channels $$u(t) = \Sigma_{i=1}^r \Phi_{u,i} \hat{u}_i(t) = \Phi_u \hat{u}(t)$$

where $\Phi_u = [\Phi_{u,1}, \ldots, \Phi_{u,r}] \in R^{n_u \times n_u}$ is a square matrix containing whose column vectors are the input channel vectors $\Phi_{u,i}$, and $\hat{u}(t) = [\hat{u}_1(t), \ldots, \hat{u}_r(t)]^{\tilde{u}}$ is a vector containing all the input channels.

An output channel $\hat{y}_i$ is a weighted sum of measured outputs y(t) i.e.

$$\hat{y}_i(t) = \Sigma_{j=1}^r \Phi_{y,ij} y_j(t) = \Phi_{y,i}^{\tilde{u}} y(t)$$

where $\Phi_{y,i}$ is a "vector" of weights that defines the i-th output channel FIG. 5 shows an example of how the output channels (504-506) are obtained by applying the weighting vectors (510-512) to the outputs (302) of the HVAC system (100). This process is referred herein as "projecting" the measured outputs y(t) onto the output channels $\hat{y}_i(t)$.

To ensure that the embodiments do not lose any the information about the system provided by the outputs y(t) (302), the output weighting vectors $\Phi_{y,i}$ should be chosen to form a linearly independent set i.e.

$$y(t) = \Phi_y^{-\tilde{u}} \hat{y}(t)$$

where $\Phi_y = [\Phi_{y,1}, \ldots, \Phi_{y,r}] \in R^{n_y \times n_y}$ is a square matrix containing whose column vectors are the output channel vectors $\Phi_{y,i}$, and $\hat{y}(t) = [\hat{y}_1(t), \ldots, \hat{y}_r(t)]^{\tilde{u}}$ containing all the output channels.

Various embodiments select the input and output channels in a specific manner so that they have independent dynamics. Specifically, the input and output channels are selected such that the input channel for each of the second transformed models does not produce a response for the output channel of the first transformed model, the output channel for each of the second transformed models has no response to the input channel of the first model, and the input channel for each of the second transformed models produces a response only for the corresponding output channel of that second transformed model and not the output channels other second transformed models.

Figure 6:
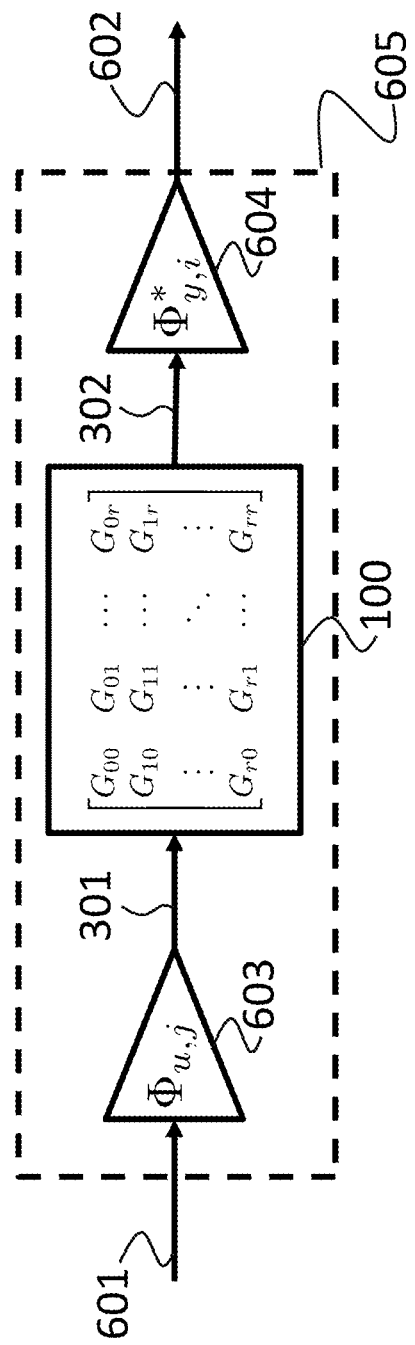
FIG. 6 shows a block diagram illustrating the dynamic relationship between an input channel and an output channel according to one embodiment.

FIG. 6 shows a block diagram illustrating the dynamic relationship between an input channel (601) and output channel (602) according to one embodiment. The low-dimensional input channel signal (601) is lifted to a higher-dimensional input signal (301) for the HVAC system (100) using the weighting vector $\Phi_{u,j}$ (603) corresponding to the input channel. The resulting control input signal (301) produces an output signal (302) from the HVAC system (100). This high-dimensional output signal (302) is projected into a lower-dimensional output channel signal (602) using the weighting vector $\Phi_{y,i}$ (604) corresponding to the output channel Thus, the dynamics from the input channel $\hat{u}_j(t)$ (601) to the output channel $\hat{y}_i(t)$ (602) are described by the system $$\hat{G}_{ij} = \Phi_{y,i}^{\tilde{u}} G \Phi_{u,j}.$$

where the hat symbol is used to indicate that $\hat{G}_{ij}$ models the dynamics between input and output channels rather than actual inputs and outputs, and the subscript ij indicate that $\hat{G}_{ij}$ models the dynamics between the j-th input channel $\hat{u}_j(t)$ and i-th output channel $\hat{y}_i(t)$.

The requirement that the input and output channels have independent dynamics, means that the models $\hat{G}_{ij}$ that model the response $\hat{y}_i(t)$ of the i-th output channel to a different j≠i input channel $\hat{u}_j(t)$ should be zero $\hat{G}_{ij} = 0$. In other words, the j-th input channel $\hat{u}_j(t)$ produces no response $\hat{y}_i(t) = \hat{G}_{ij} \hat{u}_j(t) = 0$ in the i-th output channel $y_i(t)$. This simplifies the control design since the controller does not have to worry about how the j-th input channel $\hat{u}_j(t)$ influences the i-th output channel $\hat{y}_i(t)$.

The dynamics $\hat{G}_{ii}$ between matching input $\hat{u}_i(t)$ and output channels $\hat{y}_i(t)$ can be modeled using a simpler, lower-dimensional model than the original model of the HVAC system (100). Thus, the requirement that the input and output channels have independent dynamics can be summarized by the equation $$\hat{G}_{ij} = \begin{cases} 0 & \text{if } i \neq j \\ simplemodel & \text{if } i = j \end{cases} \quad (4)$$

The models $\hat{G}_{ii}$ for $i=1, \ldots, r$ are the collection of the transformed models used by various embodiments to design the controller 200. The fact that these models are decouple refers to the fact that they satisfy the equation (4).

To satisfy Equation (4) for the symmetric HVAC system (3), the first input channel $\hat{u}_1(t)$ includes the outdoor unit inputs and applies uniform control to all the indoor units. Thus, the weighting "vector" $\Phi_{u,1}$ for the first input channel $\hat{u}_1(t)$ is $$\Phi_{u,1} = \begin{bmatrix} I_0 & 0 \\ 0 & I_1 \\ \vdots & \vdots \\ 0 & I_r \end{bmatrix}$$

where $I_0$ is an identity matrix with the same dimension as the number of inputs to the outdoor unit and $I_1 = \ldots = I_r$ are identity matrices with the same dimension as the number of inputs to each indoor unit. Since the indoor units are symmetric, they have the same number of inputs. The first output channel $\hat{y}_1(t)$ includes the measured outputs of the outdoor unit and the average temperature of all the rooms.

Thus, its weighting "vector" $\Phi_{y,1}$ is $$\Phi_{y,1} = \frac{1}{r}\begin{bmatrix} I_0 & 0 \\ 0 & I_1 \\ \vdots & \vdots \\ 0 & I_r \end{bmatrix}$$

where $I_0$ is an identity matrix with the same dimension as the number of measured signals from the outdoor unit and $I_1 = \ldots = I_r$ are identity matrices with the same dimension as the number of measured signals from each indoor unit. Since the indoor units are symmetric they have the same number of measured signals.

The remaining $r-1$ input $\hat{u}_i(t)$ and output $\hat{y}_i(t)$ channels for $i=2, \ldots, r$ can be selected by choosing any set of vectors $\phi_i$ that are mutually orthogonal $\phi_i^u \phi_j = 0$ for $i \neq j$ and orthogonal to the vector of ones $\phi_i^u 1 = \sum_{j=1}^{r} \phi_{ij} = 0$. The input channel $\hat{u}_i(t)$ weighting vectors are then chosen as $$\Phi_{u,i} = \begin{bmatrix} 0 \\ \phi_{i1} I_1 \\ \vdots \\ \phi_{ir} I_r \end{bmatrix}$$

where $I_1 = \ldots = I_r$ are identity matrices whose dimension is the number of inputs to each indoor unit. The output channel $\hat{y}_i(t)$ weighting vectors are then chosen as $$\Phi_{y,i} = \begin{bmatrix} 0 \\ \phi_{i1} I_1 \\ \vdots \\ \phi_{ir} I_r \end{bmatrix}$$

where $I_1 = \ldots = I_r$ are identity matrices whose dimension is the number of measured outputs to each indoor unit.

The dynamics $\hat{G}_{11}$ between the first input channel $\hat{u}_1(t)$ and the first output channel $\hat{y}_1(t)$ are modeled by $$\hat{G}_{11} = \begin{bmatrix} G_{00} & rG_{01} \\ G_{10} & G_{11} - (r-1)G_{12} \end{bmatrix} \quad (5)$$

where $G_{00}$ models the dynamics of the outdoor unit, $G_{11}$ models the dynamics of the indoor units, $G_{01}$ models the effects of the indoor units on the outdoor unit, $G_{10}$ models the effects of the outdoor unit on the indoor units, and $G_{12}$ models the coupling between the indoor units. Intuitively, the transformed model (5) models the HVAC system as an outdoor unit connected to a single giant indoor unit that includes the thermal mass of all r rooms. The term $rG_{10}$ means that the giant room has an effect on the outdoor unit r times larger than a regular room. If there is no coupling between the rooms $G_{12}=0$, then the model (5) says that the giant room acts just like a regular room. However, when the rooms are coupled $G_{12} \neq 0$ the coupling effect $(r-1)G_{12}$ becomes stronger with more rooms r.

For $i=2, \ldots, r$, the dynamics $\hat{G}_{ii}$ between the input $\hat{u}_i(t)$ and output $\hat{y}_i(t)$ channels is modeled by $$\hat{G}_{ii} = G_{11} - G_{12}$$

where $G_{11}$ models the dynamics of the indoor units, and $G_{12}$ models the coupling between the indoor units. Intuitively, (6) models only the internal dynamics $G_{11}$ of a room with the coupling $G_{12}$ removed. With this choice of input and output channels the coupling $\hat{G}_{ij}=0$ between non-matching channels $i \neq j$ is zero.

Figure 7:
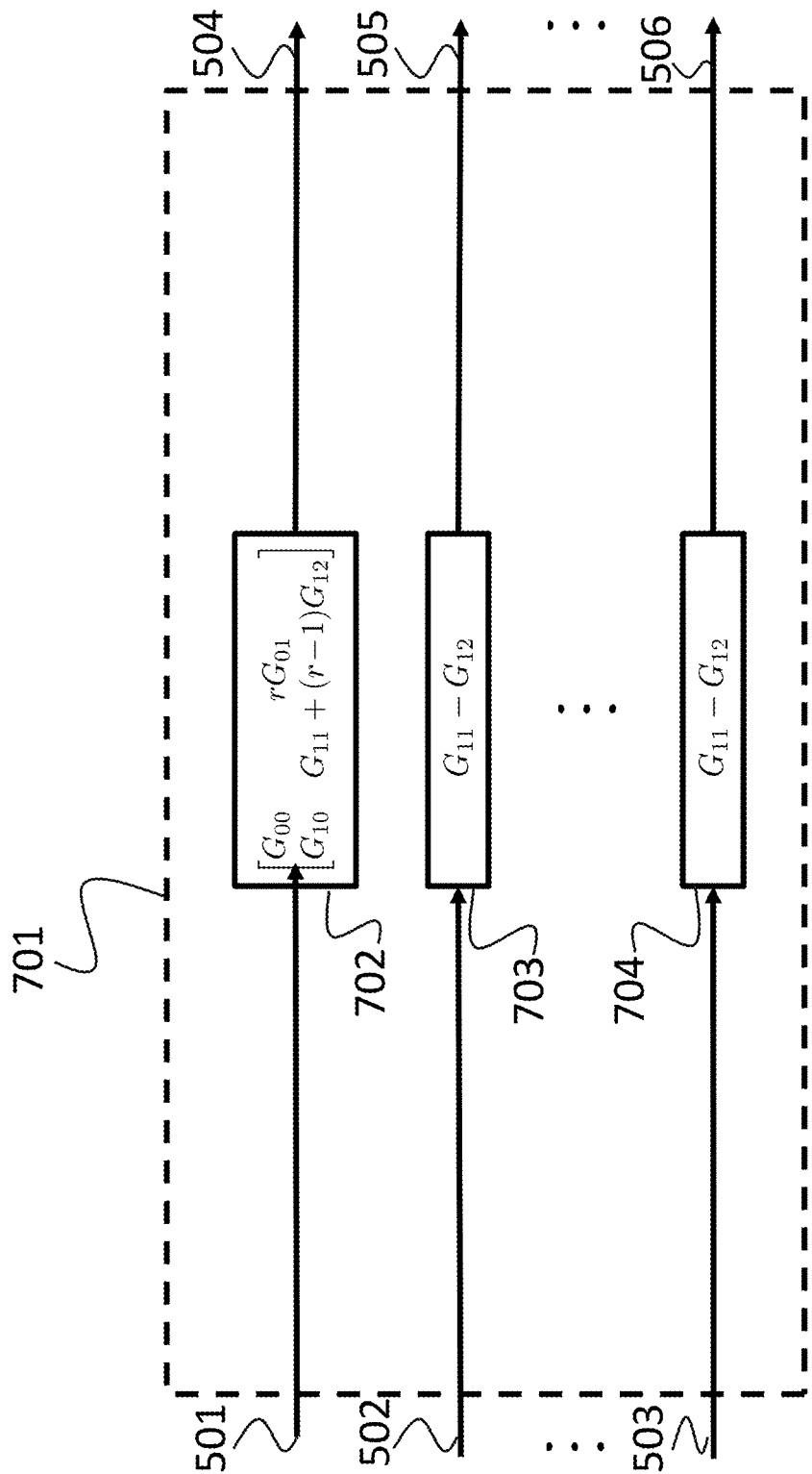
FIG. 7 shows a block diagram of decomposition of the HVAC model into the transformed models when the input and output channels are selected according some embodiments.

FIG. 7 shows a block diagram of decomposition of the HVAC model into the transformed models when the input and output channels are selected according some embodiments. The first input channel (501) only produces a response in the first output channel (504). The relationship between these channels (501) and (504) is modeled by model (5) (702). The second input channel (502) produces a response in the second output channel (505) but no response in any of the other output channels (504 or 506). The relationship between these channels (502) and (505) is modeled by model (6) (705). Likewise all the other input channels (503) only affect their corresponding output channels (506) and their relationship is modeled by the same model (6) (704). The collection of transformed models $\hat{G}_{ii}$ for $i=1, \ldots, r$ referenced in the claims is depicted by 701.

Generating a Collection of Controllers

Figure 8:
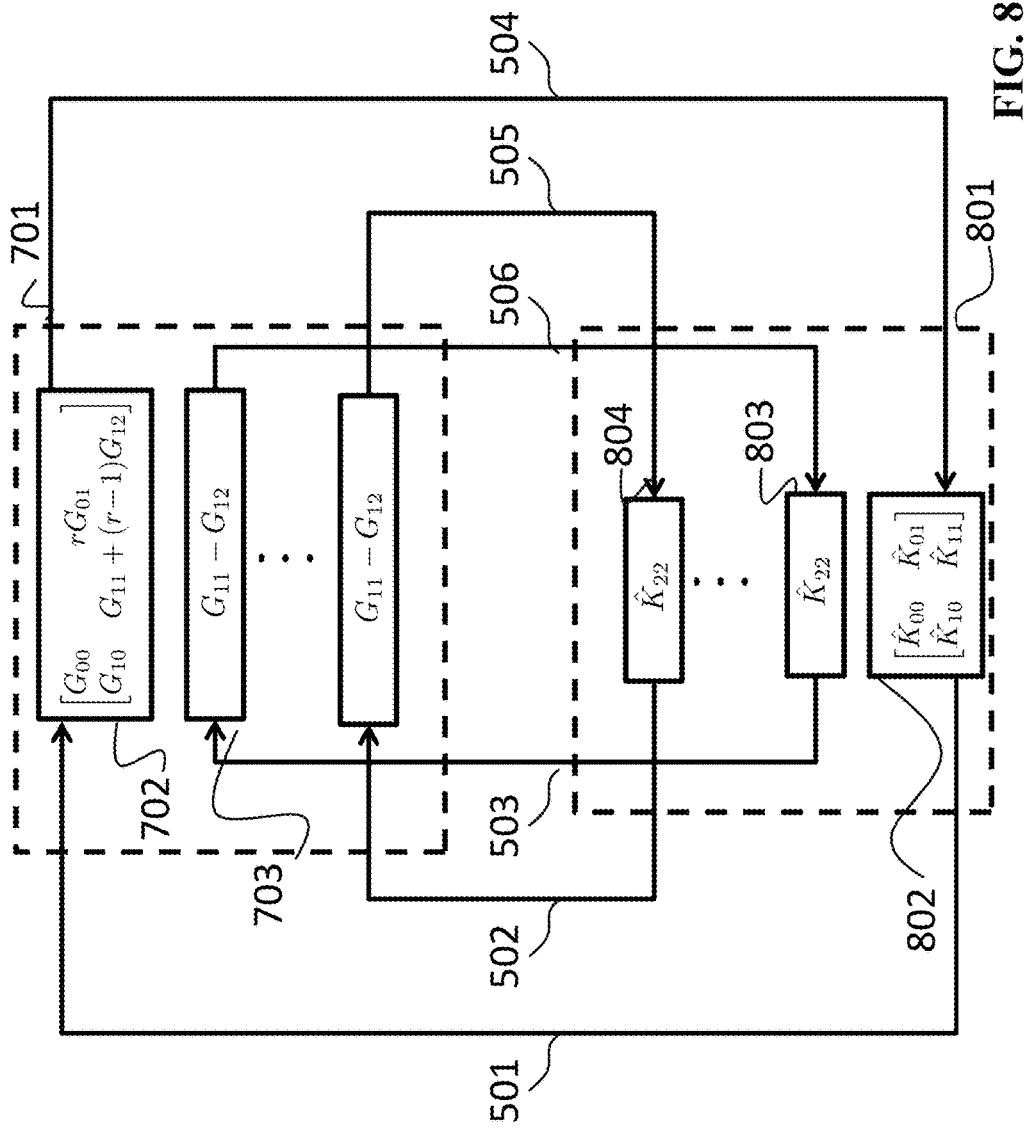
FIG. 8 shows a schematic of usage of a transformed HVAC models to design a collection of controllers according to some embodiments.

FIG. 8 shows a schematic of usage of a transformed HVAC models to design a collection of controllers according to some embodiments. Because the transformed models $\hat{G}_{ii}$ for $i=1, \ldots, r$ are decoupled according to Equation (4), the embodiments can generate controllers $\hat{K}_{ii}$ for $i=1, \ldots, r$ for each sub-model $\hat{G}_{ii}$ independently.

Various embodiments generate a collection of four sub-controllers $\hat{K}_{00}, \hat{K}_{01}, \hat{K}_{10}$ and $\hat{K}_{11}$ to control the first transformed model $\hat{G}_{11}$ (702). These controllers jointly produce a control input for the first input channel (501) based on measurements from the first output channel (504). The controllers can be generated using any linear control design technique i.e. LQR, PID, lead-lag, pole-placement, H-infinity, etc.

Another sub-controller (803) $\hat{K}_{22}$ is generated for the second transformed model $\hat{G}_{22}$ (703). Since the models $\hat{G}_{ii}$ relating the i-th input channel $\hat{u}_i(t)$ to the i-th output channel $\hat{y}_i(t)$ for i=2, . . . , r are all the same (6), the controller $\hat{K}_{22}$ can be reused for each input-output channel (803-804). Although the controllers (803-804) have the same dynamics $\hat{K}_{ii}=\hat{K}_{22}$, they measure different output channels and generate control inputs for different input channels. The copy (803) of the controller $\hat{K}_{22}$ measures the output channel (505) and produces control inputs for the input channel (502), while the copy (804) of the controller $\hat{K}_{22}$ measures the output channel (506) and produces control inputs for the input channel (503).

Generating the controllers in this manner greatly reduces the computational burden of generating a controller for an HVAC system. Jointly generating a collection of four sub-controllers $\hat{K}_{00}, \hat{K}_{01}, \hat{K}_{10}$ and $\hat{K}_{11}$ is computationally cheaper than jointly generating a collection of $(r+1)^2$?4 controllers for an HVAC system with a large number of indoor units r?1. Furthermore, all the sub-controllers $\hat{K}_{00}, \hat{K}_{01}, \hat{K}_{10}, \hat{K}_{11}$, and $\hat{K}_{22}$ are typically low-dimensional since the sub-models (5) and (6) are typically much lower-dimensional than the original HVAC model (3). In addition, the fact that the models (6) are repeated $\hat{G}_{ii}=\hat{G}_{jj}$ for i, j=2, . . . , r means that we only need to design the controller $\hat{K}_{ii}$ for i=2, . . . , r once.

Combining the Collection of Controllers

Figure 9:
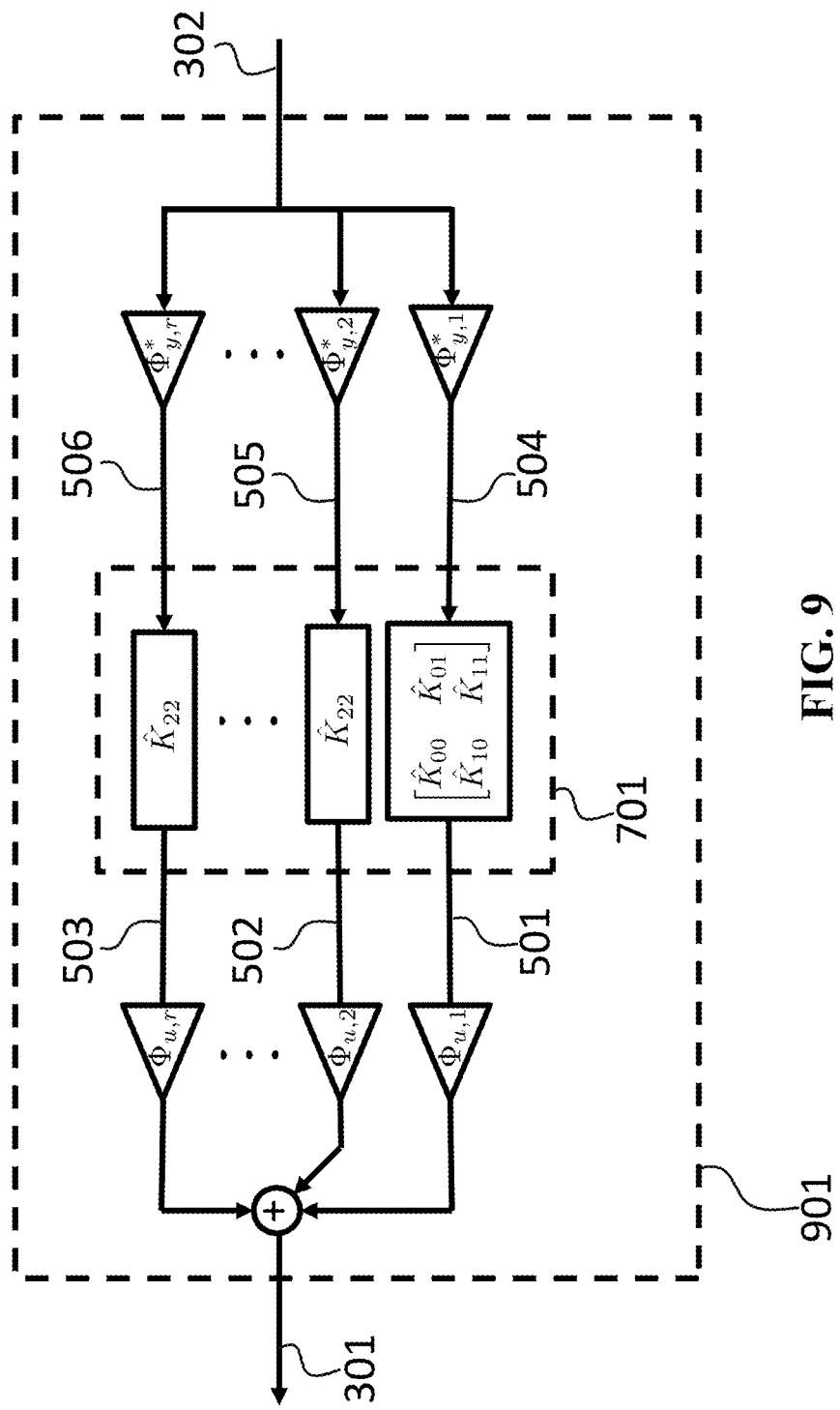
FIG. 9 shows a schematic of combining the collection of controllers to produce a controller for the HVAC system according to one embodiment.

FIG. 9 shows a schematic of combining the collection of controllers to produce a controller for the HVAC system according to one embodiment. The collection of controllers $\hat{K}_{ii}$ is designed to control the collection of transformed models $\hat{G}_{ii}$ for i=1, . . . , r. However, one embodiment produces a single controller K 901 for the untransformed HVAC system (100) by combining the collection of controllers $\hat{K}_{ii}$ for i=1, . . . , r. The controller K (901) computes a control input u(t) (301) for the HVAC systems (100) based on measurements of the HVAC outputs y(t) (302) by projecting $\hat{y}_i(t)=\Phi_{y,i}^{\ddot{u}} y(t)$ the HVAC outputs y(t) (302) onto the output channels (504-506) using the weighting vectors $\Phi_{y,i}$ corresponding to each channel i=1, . . . , r. Then each of the output channel signals $\hat{y}_i(t)$ is feed to the corresponding controller $\hat{K}_{ii}$ from the collection of controllers (701), which each produce an control input (501-503) for the corresponding input channel $\hat{u}_i(t)=\hat{K}_{ii}\hat{y}_i(t)$. The input channels are lifted $\Phi_{u,i}\hat{u}_i$ and summed $u(t)=\Sigma_{i=1}^r \Phi_{u,i}\hat{u}_i$ to produce a control input (301) for the original HVAC system (100). This controller (901) can be implemented in a distributed manner by executing the projection $\hat{y}_i(t)=\Phi_{y,i}^{\ddot{u}} y(t)$, controller evaluation $\hat{u}_i(t)=\hat{K}_{ii}\hat{y}_i(t)$, and lifting $\Phi_{u,i}\hat{u}_i$ for each channel i=1, . . . , r on different processors. Thus, if the HVAC system has a large number r of indoor units, the computation burden can be greatly reduced by distributing the computations for each of the r indoor units among r processors.

Additionally or alternatively, the controller 901 can be expressed as a single, centralized controller $$K = \sum_{i=1}^{r} \Phi_{u,i} \hat{K}_{ii} \Phi_{y,i}^{\ddot{u}}.$$

Based on the properties of the weighting vectors that define the input $\Phi_{u,i}$ and output $\Phi_{y,i}$ channels, the controller K can be written more explicitly in terms of the collection of transformed controllers $\hat{K}_{ij}$. Thus, some embodiments of this invention use a controller of the form $$K = \begin{bmatrix} \hat{K}_{00} & 0 & \cdots & 0 \\ 0 & \hat{K}_{22} & \cdots & 0 \\ \vdots & \vdots & \ddots & \vdots \\ 0 & 0 & \cdots & \hat{K}_{22} \end{bmatrix} + \frac{1}{r}\begin{bmatrix} 0 & \hat{K}_{01} & \cdots & \hat{K}_{01} \\ \hat{K}_{10} & \hat{K}_{11} - \hat{K}_{22} & \cdots & \hat{K}_{11} - \hat{K}_{22} \\ \vdots & \vdots & \ddots & \vdots \\ \hat{K}_{10} & \hat{K}_{11} - \hat{K}_{22} & \cdots & \hat{K}_{11} - \hat{K}_{22} \end{bmatrix}. \quad (7)$$

Intuitively, the first part of this controller is comprised of a controller $\hat{K}_{00}$ for the outdoor units and a series of decoupled controller $\hat{K}_{22}$ for each of the indoor units. The second part of the controller handles the coupling between the indoor units and between the indoor and outdoor units. The sub-controller $\hat{K}_{10}$ produces a control input for the indoor units based on measurements $y_0(t)$ from the outdoor unit. Each indoor unit receive 1/r of this control input $$\frac{1}{r}\hat{K}_{10}y_0(t)$$

The sub-controllers $\hat{K}_{01}$ command the outdoor unit based on the average temperatures $y_i(t)$ of the rooms i.e.

$$\frac{1}{r}\sum_{i=1}^{r}\hat{K}_{01}y_i(t) = \hat{K}_{01}\left(\frac{1}{r}\sum_{i=1}^{r}y_i(t)\right)$$

where $y_i(t)$ is the temperature of the i-th room. The sub-controllers $\hat{K}_{11}$-$\hat{K}_{22}$ are used to reduce the adverse effects of coupling between the indoor units. The sub-controller $\hat{K}_{11}$-$\hat{K}_{22}$ produce a control input based on the average temperature of all the rooms i.e.

$$\frac{1}{r}\sum_{i=1}^{r}(\hat{K}_{11} - \hat{K}_{12})y_i(t) = (\hat{K}_{11} - \hat{K}_{12})\left(\frac{1}{r}\sum_{i=1}^{r}y_i(t)\right).$$

The input $u_0(t)$ to the outdoor unit is sum of the control input $\hat{K}_{00}y_0(t)$ produced by the centralized controller $\hat{K}_{00}$ and the control inputs $\hat{K}_{01}y_i(t)$ produced by the coupling controllers $$u_0(t) = \hat{K}_{00}y_0(t) + \hat{K}_{01}\left(\frac{1}{r}\sum_{i=1}^{r}y_i(t)\right).$$

The input $u_i(t)$ to each of the indoor units i=1, . . . , r is the sum of the control input $\hat{K}_{22}y_i(t)$ produced by the centralized controller $\hat{K}_{22}$, the control input $$\frac{1}{r}\hat{K}_{10}y_0(t)$$

produced by the outdoor unit coupling controller, and the inputs $$\frac{1}{r}(\hat{K}_{11} - \hat{K}_{22})y_j(t)$$

produced by the indoor unit coupling controllers $$u_i(t) = \hat{K}_{22}y_i(t) + \frac{1}{r}\hat{K}_{10}y_0(t) + (\hat{K}_{11} - \hat{K}_{22})\left(\frac{1}{r}\sum_{j=1}^{r}y_j(t)\right).$$

Exemplar Embodiment

Exemplar embodiment is provided for illustrative purposes only. It should be understood that there are many possible variants of this procedure employed by alternative embodiments.

For the purposes of this example, the control objective is to generate a controller that minimizes the difference between the actual room temperatures and their desired set-points temperatures in the presence of unmeasured heat-loads in the rooms. The room temperature tracking error is measured using the cost function of the form $$e(t) = (y(t) - y_{des}(t))^T Q(y(t) - y_{des}(t))$$

where $y_{des}(t)$ includes the desired room temperatures, and the matrix Q is a tuning parameter chosen by the control engineer to tweak the closed-loop performance of the controller. The heat-loads are modeled as an unmeasured disturbance $w(t)$ on the system with known mean and covariance $W = E(ww^T)$.

One controller that achieves these control objectives can be generated by solving the optimization problem $$\underset{\gamma^2, X, Y}{\text{minimize}} \; \gamma^2 \quad (8)$$

$$\text{subject to} \; \underbrace{\begin{bmatrix} AX + BY + (AX + BY)^T & * & * \\ CX + DY & -Q & * \\ I & 0 & -\gamma^2 W \end{bmatrix}}_{LMI} \preceq 0 \quad (9)$$

where (A,B,C,D) are the state-space matrices of the HVAC model (1), the decision variables X and Y parameterize the controller, and the decision variable $\gamma$ is the "gain" from heat-loads $w(t)$ to tracking errors $e(t)$. The resulting optimal controller is a state-feedback controller $u(t) = Kx(t)$ with feedback gain $K = YX^{-1}$.

Optimization problems of the form (5) are called semi-definite programs and are very time and resource consuming to solve. The complexity of the optimization problem grows polynomially with the dimensions of the decision variables x and Y as well as the dimension of the matrix inequality (9). The dimensions of the decision variables $X \in R^{n_x \times n_x}$ and $Y \in R^{n_u \times n_x}$ are determined by the number of states $n_x$ and input $n_u$ in the HVAC model (1). And the dimension $2n_x + n_y$ of the matrix (9) is determined by the number of states $n_x$ and outputs $n_y$ in the HVAC model (1). Since the number of states $n_x$, inputs $n_u$, and outputs $n_y$ for an HVAC system grows with the number of rooms r, the optimization problem can easily become computationally intractable.

For the purposes of this example, the embodiment considers the linear model of Equation (1) of an HVAC system for a moderately size office building with 50 indoor units. The dimensions of this model are summarized in Table 1. This model yields high-dimensional decision variables $X \in R^{155 \times 155}$ and $Y = R^{52 \times 155}$, and a high-dimensional LMI$\in R^{364 \times 364}$ matrix inequality (9). As a result, solving the optimization problem (5) required 41 hours on a typical desktop computer. The controller could have been generated more quickly using a more powerful computational platform such as a super-computer or network cluster but that would require additional expense.

TABLE 1

Dimensions of example HVAC model

| States | $n_x = 155$ |
|---|---|
| Inputs | $n_u = 52$ |
| Outputs | $n_y = 54$ |

Instead, the exemplar embodiment can generate the exact same controller using principles described in this disclosure. The embodiment receives the model (1) of the HVAC system with dimension in Table 1 through an input interface 402. In step (402), the model (1) is decomposed into two the models (5) and (6). The dimensions of these models are summarized in Table 2. The optimization problem (5) is solved for both of these models (5) and (6). For the first model (5), the decision variables $X \in R^{8 \times 8}$ and $Y \in R^{3 \times 8}$ and matrix LMI$\in R^{19 \times 19}$ in (9) are much lower-dimensional than the original problem. Likewise, the decision variables $X \in R^{3 \times 3}$, $Y \in R^{1 \times 3}$ and matrix LMI$\in R^{19 \times 19}$ for the second model (6) are even lower-dimensional. In step (403), the optimization problem is solved for the two models (5) and (6). Since the dimensions of the models (5) and (6) are so much lower than the dimensions of the original model (1), the optimization problem can be solved in a fraction of a second. Next, in step (404) the controllers for the models (5) and (6) are combined using the procedure disclosed in FIG. 9 and corresponding description thereof to yield a controller for the original HVAC system. Finally, in step (405), the embodiment returns this controller to the control engineer using an output interface 405. For this example, the embodiment generates the desired controller in less than 1 second rather than the 41 hours required using the conventional approach.

TABLE 2

Dimensions of example transformed decomposed HVAC models

| States | $n_x = 8$ | $n_x = 3$ |
|---|---|---|
| Inputs | $n_u = 3$ | $n_u = 1$ |
| Outputs | $n_y = 5$ | $n_y = 1$ |

Figure 10:
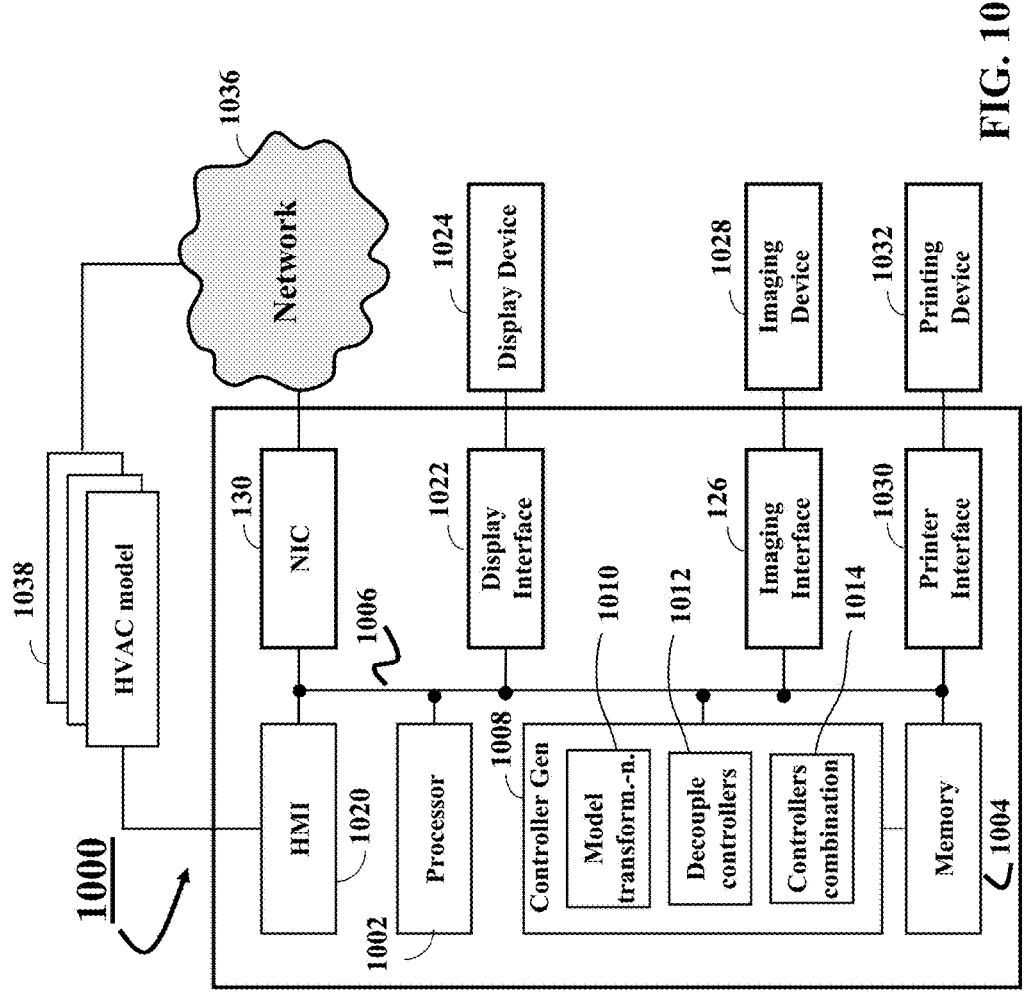
FIG. 10 shows a block diagram of a computer-implemented system for generating a controller to control a HVAC system in a building including at least one outdoor unit located outside of the building and a set of indoor units located in a set of rooms inside of the building in accordance with some embodiments.

FIG. 10 shows a block diagram of a computer-implemented system 1000 for generating a controller to control a HVAC system in a building including at least one outdoor unit located outside of the building and a set of indoor units located in a set of rooms inside of the building in accordance with some embodiments. The system 1000 includes a processor 1002 configured to execute stored instructions, as well as a memory 1004 that stores instructions that are executable by the processor. The processor 1002 can be a single core processor, a multi-core processor, a computing cluster, or any number of other configurations. The memory 1004 can include random access memory (RAM), read only memory (ROM), flash memory, or any other suitable memory systems. The memory 1004 can also include a hard drive, an optical drive, a thumbdrive, an array of drives, or any combinations thereof. The processor 1002 is connected through a bus 1006 to one or more input and output interfaces/devices.

The memory 1004 stores a controller generating procedure 1008 configured to generate a controller to control an HVAC system having a model 1038, such that the processor 1002 executing the stored instructions generates that controller. The controller generating procedure 1008 performs model transformation 1010, generates decoupled controller 1012 for the transformed model and combines 1014 the decoupled controllers into a single controller.

The system 1000 includes an input interface to accept multi-channel speech signals and an output interface to render the recognized text. Examples of the input interface include a human-to-machine interface 1020 to accepts the model 1038 from a human operator. Additionally or alternatively, the input interface can include a network interface controller 1030 adapted to connect the system 1000 through the bus 1006 to a network 1036, such as the Internet. Through the network 1036, the model 1038 can be downloaded and stored for further processing.

Examples of output interface include a display interface 1022, an imaging interface 1026, and a printer interface 1030. For example, the system 1000 can be linked through the bus 1006 to a display interface 1022 adapted to connect the system 1000 to a display device 1024, wherein the display device 1024 can include a computer monitor, camera, television, projector, or mobile device, among others.

Additionally or alternatively, the system 1000 can be connected to an imaging interface 1026 adapted to connect the system to an imaging device 1028. The imaging device 1028 can include a camera, computer, scanner, mobile device, webcam, or any combination thereof. Additionally or alternatively, the system 1000 can be connected to a printer interface 1030 adapted to connect the system 1000 to a printing device 1032. The printing device 1032 can include a liquid inkjet printer, solid ink printer, large-scale commercial printer, thermal printer, UV printer, or dye-sublimation printer, among others.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A portable computer-implemented system for generating a controller to control a heating, ventilation, and air conditioning (HVAC) system in a building including at least one outdoor unit located outside of the building and a set of indoor units located in a set of rooms inside of the building, comprising:

an input interface to accept a model of dynamics of the HVAC system defining relationship of inputs to the HVAC system to outputs of the HVAC system, wherein the input interface is configured to be connected to an onboard processor of the HVAC system to download the model;

a processor configured to decompose the model of the HVAC system into a collection of transformed models defining relationship between input channels and output channels with decoupled dynamics, such that a single input channel affects only one corresponding output channel, wherein each input channel is defined by a weighted combination of control inputs to the HVAC system, and wherein each output channel is defined by a weighted combination of temperatures affected by operation of the HVAC system, wherein the collection of decoupled transformed models includes a first transformed model modeling dynamics of the outdoor unit as a relationship between uniform control for the set of indoor units and the average temperature in the set of rooms; and a set of second transformed models, each second transformed model models a difference between room dynamics and room coupling dynamics, wherein all second transformed models are identical while modeling relationship between different input and the output channels; and generate a decouple controller for each transformed model to form a collection of decoupled controllers, wherein, each decouple controller defines a relationship between measurements the output channel and inputs to the input channel of the corresponding transformed model; and an output interface to output the collection of decoupled controllers as the controller to control the HVAC system, wherein the output interface is configured to be connected to the onboard processor of the HVAC system to upload the controller to the onboard processor of the HVAC system to control the HVAC system.

2. The system of claim 1, wherein each pair of corresponding input and output channels for the second transformed models is defined by a vector of weights forming a set of vectors of weights orthogonal to each other.

3. The system of claim 2, wherein the vectors of weights are of the same size and a sum of corresponding elements of the vectors of weights equals one.

4. The system of claim 3, wherein at least some vectors of weights include zero elements.

5. The system of claim 1, wherein the first model is $$\hat{G}_{11} = \begin{bmatrix} G_{00} & rG_{01} \\ G_{10} & G_{11} + (r-1)G_{12} \end{bmatrix}$$

where $G_{00}$ models effects of outdoor unit inputs $u_0(t)$ on outdoor unit outputs $y_0(t)$, $G_{10}$ models effects of the outdoor unit inputs $u_0(t)$ on first indoor unit outputs $y_1(t)$, $G_{01}$ models effects of first indoor unit inputs $u_1(t)$ on the outdoor unit outputs $y_0(t)$, $G_{11}$ models effects of the first indoor unit inputs $u_1(t)$ on the first indoor unit outputs $y_1(t)$, and $G_{12}$ models effects of second indoor unit inputs $u_2(t)$ on the first indoor unit outputs $y_1(t)$.

6. The system of claim 5, wherein the second model relates the i-th input channel to the i-th output channel for i=2, . . . , r as $$\hat{G}_{ii} = G_{11} - G_{12}$$

wherein, for any selection of channels, the i-th input channel produces no observable effects on the j-th output channel where i≠j.

7. The system of claim 1, wherein the processor combines the collection of decoupled controllers to obtain a controller to control the HVAC system.

8. The system of claim 1, wherein the wherein the processor sums corresponding control inputs produced by each decoupled controller using weights of corresponding input channels.

9. The system of claim 1, wherein each controller produces a control input using temperature measurements in all the rooms of the building multiplied by the weights of the corresponding output channel.

10. The system of claim 1, wherein the processor generates each decoupled controller using one or combination of linear matrix inequalities (LMI), a linear quadratic regulator (LQR), a pole placement, a proportional-integral-derivative (PID), a proportional-integral (PI), a proportional-derivative (PD), a loop-shaping, and an H-infinity method.

11. The system of claim 1, wherein at least one or combination of the input interface and the output interface includes a transceiver for exchanging information over the Internet.

12. A method for generating remotely a controller to control a heating, ventilation, and air conditioning (HVAC) system in a building including at least one outdoor unit located outside of the building and a set of indoor units located in a set of rooms inside of the building using an Internet communication channel between an onboard processor of the HVAC system and a remote server implementing the method, wherein the method uses a processor of the server coupled with stored instructions implementing the method, wherein the instructions, when executed by the processor carry out at least some steps of the method, comprising:

receiving a model of dynamics of the HVAC system from the onboard processor of the HVAC system over the Internet communication channel;

decomposing the model of dynamics of the HVAC system defining relationship of inputs to the HVAC system to outputs of the HVAC system into a collection of decoupled transformed models defining relationship between input channels and output channels with decoupled dynamics, such that a single input channel effects only one corresponding output channel, wherein each input channel is defined by a weighted combination of control inputs to the HVAC system, and wherein each output channel is defined by a weighted combination of temperatures effected by operation of the HVAC system, wherein the collection of decoupled transformed models includes a first transformed model modeling dynamics of the outdoor unit as a relationship between uniform control for the set of indoor units and the average temperature in the set of rooms; and a set of second transformed models, each second transformed model models a difference between room dynamics and room coupling dynamics, wherein all second transformed models are identical while modeling relationship between different input and the output channels;

generating a decouple controller for each transformed model to form a collection of decoupled controllers, wherein, each decouple controller defines a relationship between measurements the output channel and inputs to the input channel of the corresponding transformed model; and transmitting the collection of decoupled controllers to the onboard processor of HVAC system over the Internet communication channel as the controller to control the HVAC system.

13. The method of claim 12, wherein each pair of corresponding input and output channels is defined by a vector of weights forming a set of vectors of weights orthogonal to each other.

14. The method of claim 12, wherein the vectors of weights are of the same size and a sum of corresponding elements of the vectors of weights equals one.

15. The method of claim 14, wherein at least some vectors of weights include zero elements.

16. The method of claim 12, wherein the first model is $$\hat{G}_{11} = \begin{bmatrix} G_{00} & rG_{01} \\ G_{10} & G_{11} + (r-1)G_{12} \end{bmatrix}$$

where $G_{00}$ models effects of outdoor unit inputs $u_0(t)$ on outdoor unit outputs $y_0(t)$, $G_{10}$ models effects of the outdoor unit inputs $u_0(t)$ on first indoor unit outputs $y_1(t)$, $G_{01}$ models effects of first indoor unit inputs $u_1(t)$ on the outdoor unit outputs $y_0(t)$, $G_{11}$ models effects of the first indoor unit inputs $u_1(t)$ on the first indoor unit outputs $y_1(t)$, and $G_{12}$ models effects of second indoor unit inputs $u_2(t)$ on the first indoor unit outputs $y_1(t)$.

17. The method of claim 16, wherein the second model relates the i-th input channel to the i-th output channel for i=2, . . . , r as $$\hat{G}_{ii} = G_{11} - G_{12}$$

wherein, for any selection of channels, the i-th input channel produces no observable effects on the j-th output channel where i≠j.

18. A non-transitory computer readable storage medium embodied thereon a program executable by a processor for performing a method, the method comprising:

decomposing a model of dynamics of the HVAC system defining relationship of inputs to the HVAC system to outputs of the HVAC system into a collection of decoupled transformed models defining relationship between input channels and output channels with decoupled dynamics, such that a single input channel effects only one corresponding output channel, wherein each input channel is defined by a weighted combination of control inputs to the HVAC system, and wherein each output channel is defined by a weighted combination of temperatures effected by operation of the HVAC system, wherein the collection of decoupled transformed models includes a first transformed model modeling dynamics of the outdoor unit as a relationship between uniform control for the set of indoor units and the average temperature in the set of rooms; and a set of second transformed models, each second transformed model models a difference between room dynamics and room coupling dynamics, wherein all second transformed models are identical while modeling relationship between different input and the output channels;

generating a decouple controller for each transformed model to form a collection of decoupled controllers, wherein, each decouple controller defines a relationship between measurements the output channel and inputs to the input channel of the corresponding transformed model; and controlling the HVAC system using the collection of decoupled controllers as the controller.

19. The medium of claim 18, wherein each pair of corresponding input and output channels for the second transformed models is defined by a vector of weights forming a set of vectors of weights orthogonal to each other.

20. The medium of claim 19, wherein the vectors of weights are of the same size and a sum of corresponding elements of the vectors of weights equals one.

* * * * *